US009304989B2

(12) United States Patent
Spivack et al.

(10) Patent No.: US 9,304,989 B2
(45) Date of Patent: *Apr. 5, 2016

(54) MACHINE-BASED CONTENT ANALYSIS AND USER PERCEPTION TRACKING OF MICROCONTENT MESSAGES

(71) Applicant: BOTTLENOSE, INC., New York, NY (US)

(72) Inventors: Nova Spivack, Sherman Oaks, CA (US); Dominiek ter Heide, Amsterdam (NL)

(73) Assignee: Bottlenose, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,875

(22) Filed: Dec. 8, 2014

(65) Prior Publication Data

US 2015/0095021 A1    Apr. 2, 2015

Related U.S. Application Data

(63) Continuation of application No. 14/015,021, filed on Aug. 30, 2013, now Pat. No. 8,938,450, which is a continuation of application No. 13/771,069, filed on Feb. 19, 2013, now Pat. No. 8,832,092.

(60) Provisional application No. 61/723,280, filed on Nov. 6, 2012, provisional application No. 61/600,553, filed on Feb. 17, 2012.

(51) Int. Cl.
*G06F 17/30* (2006.01)
*G06F 17/28* (2006.01)
(Continued)

(52) U.S. Cl.
CPC .............. *G06F 17/28* (2013.01); *G06F 17/275* (2013.01); *G06F 17/2705* (2013.01); *G06F 17/2765* (2013.01); *G06F 17/3043* (2013.01); *G06F 17/30292* (2013.01); *G06N 99/005* (2013.01)

(58) Field of Classification Search
None
See application file for complete search history.

(56) References Cited

U.S. PATENT DOCUMENTS 6,151,585 A    11/2000  Altschuler et al.
6,286,005 B1    9/2001  Cannon
(Continued)

FOREIGN PATENT DOCUMENTS

GB    2502736 A    12/2013
GB    2502737 A    12/2013
(Continued)

OTHER PUBLICATIONS

Internation Search Report and Written Opinion for Application No. PCT/US2013/52981, Date of Filing: Jul. 31, 2013, Applicant: Bottlenose Inc., Date of Mailing: Oct. 8, 2013, 10 pages.

(Continued)

*Primary Examiner* — Belix M Ortiz Ditren

(57) ABSTRACT

A system and a method for microcontent natural language processing are presented. The method comprising steps of receiving a microcontent message from a social networking server, tokenizing the microcontent message into one or more text tokens, performing a topic extraction on the microcontent message to extract topic metadata, generating sentiment metadata for the microcontent message, analyzing co-occurrence of all available metadatas in the plurality of microcontent messages, producing a list that ranks the plurality of microcontent messages based on all available topic metadata, and compiling a trend database that reveals how perception of users of the social networking server on a given topic changes by tracking how the list changes over time.

19 Claims, 17 Drawing Sheets

(51) Int. Cl.
*G06F 17/27* (2006.01)
*G06N 99/00* (2010.01)

(56) References Cited

U.S. PATENT DOCUMENTS

| | | |
|---|---|---|
| 6,373,483 B1 | 4/2002 | Becker et al. |
| 7,512,612 B1 | 3/2009 | Akella et al. |
| 7,636,714 B1 | 12/2009 | Lamping et al. |
| 7,885,844 B1 | 2/2011 | Cohen et al. |
| 8,073,850 B1 | 12/2011 | Hubbard et al. |
| 8,086,605 B2 | 12/2011 | Xu et al. |
| 8,166,026 B1 | 4/2012 | Sadler |
| 8,166,925 B2 | 5/2012 | Suggett et al. |
| 8,352,549 B2 | 1/2013 | Sacco et al. |
| 8,375,024 B2 | 2/2013 | Goeldi |
| 8,762,302 B1 | 6/2014 | Spivack et al. |
| 8,832,092 B2 | 9/2014 | Spivack et al. |
| 8,909,569 B2 | 12/2014 | Spivack et al. |
| 8,938,450 B2 | 1/2015 | Spivack et al. |
| 8,990,097 B2 | 3/2015 | Spivack et al. |
| 9,009,126 B2 | 4/2015 | Spivack et al. |
| 2002/0023020 A1 | 2/2002 | Kenyon et al. |
| 2002/0082923 A1 | 6/2002 | Merriman et al. |
| 2003/0110056 A1 | 6/2003 | Berghofer et al. |
| 2003/0229531 A1 | 12/2003 | Heckerman et al. |
| 2004/0225592 A1 | 11/2004 | Churquina |
| 2004/0249713 A1 | 12/2004 | Gross |
| 2005/0060312 A1 | 3/2005 | Curtiss et al. |
| 2005/0108630 A1* | 5/2005 | Wasson ............... G06F 17/241 715/230 |
| 2005/0114786 A1 | 5/2005 | Decombe |
| 2005/0131897 A1 | 6/2005 | Grasso et al. |
| 2005/0154690 A1 | 7/2005 | Nitta et al. |
| 2005/0192957 A1 | 9/2005 | Newbold |
| 2005/0256866 A1 | 11/2005 | Lu et al. |
| 2006/0041543 A1 | 2/2006 | Achlioptas |
| 2006/0059055 A1 | 3/2006 | Lin |
| 2006/0074836 A1 | 4/2006 | Gardner et al. |
| 2006/0112111 A1 | 5/2006 | Tseng et al. |
| 2006/0112146 A1 | 5/2006 | Song et al. |
| 2006/0173957 A1 | 8/2006 | Robinson et al. |
| 2006/0218577 A1 | 9/2006 | Goodman et al. |
| 2006/0248073 A1 | 11/2006 | Jones et al. |
| 2006/0282303 A1 | 12/2006 | Hale et al. |
| 2006/0282328 A1 | 12/2006 | Gerace et al. |
| 2006/0294085 A1 | 12/2006 | Rose et al. |
| 2006/0294086 A1 | 12/2006 | Rose et al. |
| 2006/0294134 A1 | 12/2006 | Berkhim et al. |
| 2007/0027744 A1 | 2/2007 | Carson et al. |
| 2007/0078699 A1 | 4/2007 | Scott et al. |
| 2007/0121843 A1 | 5/2007 | Atazky et al. |
| 2007/0124432 A1 | 5/2007 | Holtzman et al. |
| 2007/0150398 A1 | 6/2007 | Rossen et al. |
| 2007/0156636 A1 | 7/2007 | Norton et al. |
| 2007/0168533 A1 | 7/2007 | Canright et al. |
| 2007/0174057 A1 | 7/2007 | Genly |
| 2007/0203996 A1 | 8/2007 | Davitz et al. |
| 2007/0208613 A1 | 9/2007 | Backer |
| 2007/0219863 A1 | 9/2007 | Park et al. |
| 2007/0226248 A1 | 9/2007 | Darr |
| 2007/0282867 A1 | 12/2007 | McAllister et al. |
| 2007/0297405 A1 | 12/2007 | He |
| 2008/0004942 A1 | 1/2008 | Calabria |
| 2008/0010253 A1 | 1/2008 | Sidhu et al. |
| 2008/0040474 A1 | 2/2008 | Zuckerberg et al. |
| 2008/0040475 A1 | 2/2008 | Bosworth et al. |
| 2008/0059466 A1 | 3/2008 | Luo et al. |
| 2008/0104225 A1 | 5/2008 | Zhang et al. |
| 2008/0133426 A1 | 6/2008 | Porat et al. |
| 2008/0133503 A1 | 6/2008 | Popescul et al. |
| 2008/0177813 A1 | 7/2008 | Wang et al. |
| 2008/0215429 A1 | 9/2008 | Ramer et al. |
| 2008/0215557 A1 | 9/2008 | Ramer et al. |
| 2008/0215571 A1 | 9/2008 | Huang et al. |
| 2008/0250450 A1 | 10/2008 | Larner et al. |
| 2008/0255935 A1 | 10/2008 | Madhavan et al. |
| 2008/0275833 A1 | 11/2008 | Zhou et al. |
| 2008/0275861 A1 | 11/2008 | Baluja et al. |
| 2008/0281661 A1 | 11/2008 | Young et al. |
| 2008/0288305 A1 | 11/2008 | LaLuzerne et al. |
| 2008/0288596 A1 | 11/2008 | Smith et al. |
| 2008/0297513 A1 | 12/2008 | Greenhill et al. |
| 2008/0313011 A1 | 12/2008 | Rose et al. |
| 2009/0037521 A1 | 2/2009 | Zilca et al. |
| 2009/0049038 A1 | 2/2009 | Gross |
| 2009/0049308 A1 | 2/2009 | Jin et al. |
| 2009/0106224 A1 | 4/2009 | Roulland et al. |
| 2009/0106244 A1 | 4/2009 | Dash et al. |
| 2009/0119173 A1 | 5/2009 | Parsons et al. |
| 2009/0209286 A1 | 8/2009 | Bentley et al. |
| 2009/0234828 A1 | 9/2009 | Tu |
| 2009/0240647 A1 | 9/2009 | Green et al. |
| 2009/0276500 A1 | 11/2009 | Karmarkar |
| 2009/0319342 A1 | 12/2009 | Shilman et al. |
| 2009/0327275 A1 | 12/2009 | Walker et al. |
| 2010/0030648 A1 | 2/2010 | Manolescu et al. |
| 2010/0042944 A1 | 2/2010 | Robinson et al. |
| 2010/0049852 A1 | 2/2010 | Whitnah et al. |
| 2010/0058196 A1 | 3/2010 | Krishnan et al. |
| 2010/0070448 A1 | 3/2010 | Omoigui |
| 2010/0082695 A1 | 4/2010 | Hardt |
| 2010/0083124 A1 | 4/2010 | Druzgalski et al. |
| 2010/0094939 A1 | 4/2010 | Cheng et al. |
| 2010/0100537 A1 | 4/2010 | Druzgalski et al. |
| 2010/0114946 A1 | 5/2010 | Kumar et al. |
| 2010/0119053 A1 | 5/2010 | Goeldi |
| 2010/0121707 A1 | 5/2010 | Goeldi |
| 2010/0121817 A1 | 5/2010 | Meyer et al. |
| 2010/0121839 A1 | 5/2010 | Meyer et al. |
| 2010/0174692 A1 | 7/2010 | Meyer et al. |
| 2010/0235489 A1 | 9/2010 | Cogan |
| 2010/0281041 A1 | 11/2010 | Almeida |
| 2010/0306049 A1 | 12/2010 | Kakade et al. |
| 2010/0306192 A1 | 12/2010 | Kapur et al. |
| 2010/0312769 A1* | 12/2010 | Bailey ............... G06F 17/30705 707/740 |
| 2011/0004465 A1 | 1/2011 | Rose et al. |
| 2011/0022602 A1 | 1/2011 | Luo et al. |
| 2011/0029636 A1 | 2/2011 | Smyth et al. |
| 2011/0067030 A1 | 3/2011 | Isard et al. |
| 2011/0067076 A1 | 3/2011 | Harris et al. |
| 2011/0078156 A1 | 3/2011 | Koss |
| 2011/0093459 A1 | 4/2011 | Dong et al. |
| 2011/0096915 A1 | 4/2011 | Nemer |
| 2011/0184806 A1 | 7/2011 | Chen et al. |
| 2011/0191372 A1 | 8/2011 | Kaushansky et al. |
| 2011/0206198 A1 | 8/2011 | Freedman et al. |
| 2011/0213661 A1 | 9/2011 | Milana et al. |
| 2011/0213894 A1 | 9/2011 | Silberstein et al. |
| 2011/0238496 A1 | 9/2011 | Gurbuxani et al. |
| 2011/0238647 A1 | 9/2011 | Ingram et al. |
| 2011/0264599 A1 | 10/2011 | Dalton |
| 2011/0282874 A1 | 11/2011 | Xu et al. |
| 2011/0307429 A1 | 12/2011 | Probst et al. |
| 2011/0314007 A1 | 12/2011 | Dassa et al. |
| 2011/0320715 A1 | 12/2011 | Ickman et al. |
| 2012/0005224 A1 | 1/2012 | Ahrens et al. |
| 2012/0047219 A1 | 2/2012 | Feng et al. |
| 2012/0066073 A1 | 3/2012 | Dilip et al. |
| 2012/0102021 A1 | 4/2012 | Hill et al. |
| 2012/0136959 A1 | 5/2012 | Kadam et al. |
| 2012/0137367 A1 | 5/2012 | Dupont et al. |
| 2012/0158613 A1 | 6/2012 | Bollen et al. |
| 2012/0166438 A1 | 6/2012 | Wu et al. |
| 2012/0170726 A1 | 7/2012 | Schwartz |
| 2012/0185544 A1 | 7/2012 | Chang et al. |
| 2012/0191715 A1 | 7/2012 | Ruffner et al. |
| 2012/0246054 A1 | 9/2012 | Sastri |
| 2012/0272160 A1 | 10/2012 | Spivack et al. |
| 2012/0296920 A1 | 11/2012 | Sahni et al. |
| 2013/0007126 A1 | 1/2013 | Ziemann |
| 2013/0013801 A1 | 1/2013 | Leeder |
| 2013/0018698 A1 | 1/2013 | Parnaby et al. |
| 2013/0046603 A1 | 2/2013 | Grigg et al. |

(56) References Cited

U.S. PATENT DOCUMENTS

| | | | |
|---|---|---|---|
| 2013/0125027 A1 | 5/2013 | Abovitz | |
| 2013/0144682 A1 | 6/2013 | Dhara et al. | |
| 2013/0159507 A1 | 6/2013 | Mason et al. | |
| 2013/0198204 A1 | 8/2013 | Williams et al. | |
| 2013/0304818 A1 | 11/2013 | Brumleve et al. | |
| 2014/0035920 A1 | 2/2014 | Duwenhorst | |

FOREIGN PATENT DOCUMENTS

| | | | |
|---|---|---|---|
| JP | 2003288437 A | 10/2003 | |
| JP | 2006227965 A | 8/2006 | |
| KR | 20090074108 A | 7/2009 | |
| WO | WO-2006073977 A1 | 7/2006 | |
| WO | WO-2006116516 A2 | 11/2006 | |
| WO | WO-2008006059 A2 | 1/2008 | |
| WO | WO-2009007754 A1 | 1/2009 | |
| WO | WO-2009035618 A2 | 3/2009 | |

OTHER PUBLICATIONS

Exam Report for CA2,824,605 Applicant: Bottlenose, Inc., Date of Mailing Sep. 16, 2014, 4 pages.
International Search Report & Written Opinion for Application No. PCT/US2012/026410, Date of filing: Feb. 23, 2012, Applicant: Spivack Nova et al., Date of Mailing: Sep. 23, 2012, 11 pages.
International Search Report & Written Opinion for Application No. PCT/US2012/026405, Date of filing: Feb. 23, 2012, Applicant: Spivack Nova et al., Date of Mailing: Dec. 28, 2012, 15 pages.
International Search Report & Written Opinion for Application No. PCT/US2013/023504, Date of filing: Jan. 28, 2013, Applicant: Bottlenose Inc., Date of Mailing: Jun. 11, 2013, 20 pages.
International Search Report & Written Opinion for Application No. PCT/US 2013/26763, Date of filing: Feb. 19, 2013, Applicant: Bottlenose, Inc., Date of Mailing: Apr. 23, 2013, 8 pages.
International Search Report & Written Opinion for Application No. PCT/US2013/26528, Date of filing: Feb. 15, 2013, Applicant: Bottlenose Inc., Date of Mailing: Apr. 18, 2013, 9 pages.
Brdiczka et al., "Automatic Detection of Interaction Groups," ICMI, 2005, 5 pages.
Wyatt et al, "Conversation and Speaker Segmentation in Privacy-Sensitive Situated Speech Data," Interspeech, 2007, 4 pages.
International Search Report and Written Opinion for Application No. PCT/US2013/68810, Date of Filing: Nov. 6, 2013, Applicant: Bottlenose Inc., Date of Mailing: May 7, 2014, 10 pages.
Zhou et al., "PowerTrust: A Robust and Scalable Reputation System for Trusted Peer-To-Peer Computing," 2007 IEEE, 30 pages.
Lu et al., "Finding Query Suggestions for PubMed," 2009, AMIA 2009 Symposium Proceedings, 5 pages.
Makkonen et al., "Topic Detection and Tracking with Spatio-Temporal Evidence," Department of Computer Science, University of Helsinki, Finland, published Spring 2003, 15 pages.
Fan et al., "Suggesting Topic-Based Query Terms as Your Type," 2010 12th International Asia-Pacific Web Conference, Apr. 2010, 7 pages.
Guha et al., "Propagation of trust and distrust," In Proceedings of the 13th International Conference on World Wide Web, New York, NY, USA, May 17-20, 2004, WWW '04. ACM. New York, NY, pp. 403-412.
Ziegler et al., "Propagation Models for Trust and Distrust in Social Networks," Information Systems Frontiers 7, Dec. 2005, pp. 337-358.
Tao et al., "Selectivity Estimation of Predictive Spatio-Temporal Queries," Proceedings 19th International Conference on Data Engineering, ICDE'2003, Bangladore, India, Mar. 5-8, 2003, pp. 417-428.
Dai et al, "Mining Anchor Text Trends for Retrieval," Department of Computer Science and Engineering, Lehigh University, USA, Mar. 28, 2010, pp. 127-139.
Ashkan et al., "Classifying and Characterizing Query Intent," University of Waterloo, Canada, Emory University, USA, Apr. 6, 2009, pp. 578-586.
Garfield, "Citation Analysis as a Tool in Journal Evaluation," Essays of an Information Scientist, vol. 1, 1972, 24 pages.
Johnson, Celeb, "Likebutton.me Reveals What Your Friends 'Like' Across the Web," from the internet, http://www.switched.com, Apr. 26, 2010, 8 pages.
Dietz et al., "Unsupervised Prediction of Citation Influences," Proceedings of the 24th International Conference on Machine Learning. Jun. 20, 2007, pp. 233-240.
Huang et al. "Conversational Tagging in Twitter," Proceedings of the 21st ACM Conference on Hypertext and Hypermedia, Jun. 13, 2010, 5 page.
Page, et al., "The PageRank Citation Ranking: Bringing Order to the Web," from the internet, http://dbpubs.stanford.edu/pub, 1998.
Massa et al, "Using Trust in Recommender Systems: An Experimental Analysis," International Graduate School in Information and Communication Technologies, University of Trento, 38050 Povo, Italy, Feb. 26, 2004, 15 pages.
Liu et al., "Co-authorship networks in the digital library research community," 2005, Elsevier, Information Processing and Management 41, 2005, pp. 1462-1480.
von der Weth et al., "Towards an Objective Assessment of Centrality Measures in Reputation Systems," 2007 IEEE, 8 pages.
European Search Report for 14151134.5, Applicant: Bottlenose, Inc., Date of Mailing: May 27, 2014, 8 pages.
European Search Report for 14151154.3, Applicant: Bottlenose, Inc., Date of Mailing: May 27, 2014, 8 pages.
International Search Report & Written Opinion for Application No. PCT/US2014/017757, Date of filing: Feb. 21, 2014, Applicant: Bottlenose, Inc., Date of Mailing: Jul. 7, 2014, 9 pages.
Exam Report for GB1302155.5, Applicant: Bottlenose, Inc., Date of Mailing: Jun. 26, 2014, 2 pages.
Exam Report for EP12748879.9, Applicant: Bottlenose, Inc., Date of Mailing: Jul. 3, 2014, 8 pages.
Exam Report for GB13156765, Applicant: Bottlenose, Inc., Date of Mailing Jul. 4, 2014, 3 pages.
Exam Report for GB1410563.9, Applicant: Bottlenose, Inc., Date of Mailing Jul. 30, 2014, 12 pages.
Exam Report for CA2,866,615 Applicant: Bottlenose, Inc., Date of Mailing Oct. 29, 2014, 4 pages.
Exam Report for GB1315674.0, Applicant: Bottlenose, Inc., Date of Mailing Nov. 13, 2014, 7 pages.
Exam Report for EP13749163.5, Applicant: Bottlenose, Inc., Date of Mailing: Jun. 29, 2015, 8 pages.

\* cited by examiner

StreamOS Data Explorer

Query Editor  Services  Activity Rendering

Query the system for any kind of stream. Results shown on the right.

Source Query [ Facebook: Search activities ▼ ]

```
1  {
2    "get": {
3      "service": "facebook",
4      "collectionId": "search/activities",
5      "target": {
6        "query": "SpaceX"
7      }
8    }
9  }
```

[ Run Query ]

Stream Data Results     As Grid | As JSON | As Stream

| publishedTs | actor.displayName | title | objec... | verb |
|---|---|---|---|---|
| A minute ago | Per Lindstrand | http://www.theverge.com/2012/5/25/3042499... | bookm... | post |
| 5 minutes ago | Kamiar Jafarifar | Here's some information about today's planne... | image | post |
| 8 minutes ago | Shahid Mahmood Butt | Historical Docking (Watch LIVE): SpaceX Dra... | bookm... | post |
| 8 minutes ago | Scott Merrick | http://www.nasa.gov/multimedia/nasatv/inde... | bookm... | post |
| 10 minutes ago | Jiří "Shigor Birdman"... | tak ted me pobavil spaceX :) obiwan volal z b... | note | post |
| 12 minutes ago | Brian Pfeifer | Go SpaceX! | note | post |
| 15 minutes ago | Ekpa Ekanem | SpaceX Dragon holding pattern @ 250 metres... | note | post |
| 15 minutes ago | Don Courtney | The view from the @[353851464130:274:Spac... | image | post |
| 16 minutes ago | Eric Proces | Good luck to the SpaceX Dragon this morning! | note | post |
| 19 minutes ago | Justin Kyle Sheppard | http://www.bbc.co.uk/news/science-environm... | bookm... | post |
| 19 minutes ago | Eric McAnly | Dragon SpaceX docks with the international sp... | bookm... | post |
| 22 minutes ago | Nishanth Arya | The view from the @[353851465130:274:Spac... | image | post |
| 23 minutes ago | Gaurav Shinde | Watch it live | bookm... | post |
| 23 minutes ago | Amol Wagh | The view from the @[353851465130:274:Spac... | image | post |
| 23 minutes ago | Basiley Lofichenko | The view from the @[353851465130:274:Spac... | image | post |

*FIG. 2*

Compose a Custom Stream

Find messages in [Twitter Search ▾] with Keyword: [SpaceX]

Include messages with [all ▾] of the following conditions:

[Number of Reposts in my Network ▾] [is greater than ▾] [1] [+] [−]

[Relevance to You ▾] [is greater than ▾] [30] [+] [−]

[Author Follower Count ▾] [is greater than ▾] [4000] [+] [−]

[ ▾] [contains ▾] [/opinion] [+] [−]

[ ▾] [contains ▾] [Select type(s)] [+] [−]

-- Message Data --
Message Content
Message Type
Message Topics
Mentioned People
-- Author Info --
Author Screen Name
Author Follower Count
Author Following Count
Author Average Messages per Day
-- Metrics --
Number of Reposts in my Network
Relevance to You
Number of Times You Mentioned Author
-- Message Source --
Social Network
Incoming Account
Appears in Stream
-- Other --
Message Flags
Any Field
Activity Verb

[ ] een on Spanish bank
   e pressing issue for some

[Save]

*FIG. 3*

Annotate Activity

[image] zerohedge

Airbus workers seek jobs guarantee over U.S. move reut.rs/N22Xtx 7 minutes ago

Types

[ × /news ]

Topics

[ × Airbus ] [ × U.S. ] [ × guarantee ]
[ × worker ]

Sentiment

○ Negative | ◉ Neutral | ○ Positive

Done: 0 messages

[ Previous ] [ Next ]
[ Save ]

*FIG. 7*

| Top Mentioned People (by Mentions) | | Top Contributors (by Mentions) | | Top Mentioned People (by Impressions) | |
|---|---|---|---|---|---|
| | # Mentions | | # Mentions | | # Impressions |
| @youtube | 3,503 | @RealHollywoodTr | 3,172 | @celebrityhg | 109,080k |
| @peopleschoice | 2,827 | @JulienLanger | 1,570 | @youtube | 54,857k |
| @celebnewsfast | 1,526 | @celebnews1456 | 1,559 | @goldenglobes | 33,833k |
| @carlosparejo | 1,036 | @dreezyfasho | 1,520 | @marioniwayans | 29,233k |
| @_kosher | 800 | @StevenSeagal | 1,393 | @cw_network | 25,716k |
| @imghettobarbie | 786 | @Celeb_News_UK | 974 | @juddapatow | 25,567k |
| @foursquare | 779 | @i_Celeb_Gossip910 | | @soundclick | 25,320k |
| @eonline | 655 | @DonyaPatel | 907 | @nytimes | 23,550k |
| @real_liam_payne | 560 | @i_AnneHathaway | 890 | @timestalks | 23,151k |
| @arianagrande | 523 | @i_KellyClarkson 810 | | @lesliejmann | 21,763k |
| @soundclick | 497 | @Pornific | 793 | @covenanthouse | 20,767k |
| @cassadeepope | 493 | @high_on_glitter778 | | @virginmlive | 20,740k |
| @sophiaabrahao | 481 | @carmenPorn | 777 | @timeculture | 16,556k |

| Top Contributors (by Followers) | | Top Positive Contributors | | | Top Negative Contributors | | |
|---|---|---|---|---|---|---|---|
| | # Followers | | #Mentions | #Followers | | #Mentions | #Followers |
| @PerezHilton | 402,721k | @RealHollywoodTr | 3,127 | 17,409k | @Celeb_News_UK | 974 | 4,392k |
| @eonline | 345,330k | @dreezyfasho | 1,520 | 3,182k | @i_Celeb_Gossip | 910 | 1,950k |
| @RealTonyRocha | 327,103k | @StevenSeagal | 1,393 | 3,506k | @i_AnneHathaway | 890 | 2,126k |
| @HuffingtonPost | 148,860k | @ObnoxiousBot | 679 | 1,189k | @J_Aniston_Watch | 662 | 1,013k |
| @disneywords | 110,153k | @KateUptonWatch | 573 | 1,143k | @Fan_HilaryDuff | 612 | 1,193k |
| @CELEBRITYHG | 109,080k | @pornz1 | 571 | 4,248k | @MileyCyrus_Look | 607 | 2,153k |
| @high_on_glitter | 103,896k | @i_Jen_Lawrence | 539 | 673k | @MegarFox_Watch | 577 | 2,300k |
| @OMGFacts | 62,354k | @JBStarFanatic | 525 | 2,849k | @KayneWest_Fans1 | 563 | 594k |
| @funkmasterflex | 51,576k | @patbelieber | 509 | 2,122k | @LadyGaGa_News | 505 | 2,396k |
| @TheFunnySayings | 48,617k | @Marvin_Promotes | 471 | 569k | @Chris\Hemsworth.v | 470 | 737k |
| @106andpark | 47,329k | @FlixsterUVHelp | 438 | 843k | @NickiMinajWatch | 362 | 875k |
| @EW | 42,128k | @HapyBabyWorkout | 405 | 768k | @Chin_Hartney | 340 | 686k |
| @YouTube | 41,560k | @Cneil_IahWeh | 300 | 4,611k | @Oprah_Watch | 328 | 718k |

FIG. 9

Bottlenose Runtime Information  ✕

Plugins | Simulations

Plugins currently running: (* = builtin plugins)

[unload] Bitly URL Shortening*
[unload] Standard Hotkeys*
[unload] Settings*
[unload] Plugin Directory*
[unload] Add Streams*
[unload] Multi Column Stream View*
[unload] Overview Stream View*
[unload] Sonar Stream View*
[unload] Reader Stream View*
[unload] Newspaper Stream View*
[unload] Profile Stream View*
[unload] Indicate Number*
[unload] Desktop Notification*
[unload] Play Sound*
[unload] Set Color*
[unload] Dashboard Context View*
[unload] Search Context View*
[unload] User Subscription*
[unload] Stream Data Explorer
[unload] Bottlenose Dev Tools*
[unload] Dingbats

*FIG. 14*

MACHINE-BASED CONTENT ANALYSIS AND USER PERCEPTION TRACKING OF MICROCONTENT MESSAGES

CROSS-REFERENCE TO RELATED APPLICATIONS

The above-mentioned U.S. patent application Ser. No. 13/771,069 also claims the benefit of U.S. Provisional Application No. 61/723,280 under 35 U.S.C. §119(e), entitled "SYSTEMS AND METHOD FOR CONTINUOUS AND REAL-TIME OR NEAR REAL-TIME TARGETING OF SOCIAL NETWORK ADVERTISEMENTS AND OTHER PROMOTIONAL CONTENT," filed on Nov. 6, 2012, the contents of which are incorporated herein by reference.

This application also claims the benefit of U.S. Provisional Application No. 61/723,280 under 35 U.S.C. §119(e), entitled "SYSTEMS AND METHOD FOR CONTINUOUS AND REAL-TIME OR NEAR REAL-TIME TARGETING OF SOCIAL NETWORK ADVERTISEMENTS AND OTHER PROMOTIONAL CONTENT," filed on Nov. 6, 2012, the contents of which are incorporated herein by reference.

This application is related to U.S. patent application Ser. No. 13/403,937, entitled "SYSTEM AND METHOD FOR ANALYZING MESSAGES IN A NETWORK OR ACROSS NETWORKS,' filed on Feb. 23, 2012, the contents of which are incorporated herein by reference.

This application is related to U.S. patent application Ser. No. 13/752,333, entitled "TRENDING OF AGGREGATED PERSONALIZED INFORMATION STREAMS AND MULTI-DIMENSIONAL GRAPHICAL DEPICTION THEREOF,' filed on Jan. 28, 2013, the contents of which are incorporated herein by reference.

This application is related to U.S. patent application Ser. No. 13/752,343, entitled "TARGETED ADVERTISING BASED ON TRENDING OF AGGREGATED PERSONALIZED INFORMATION STREAMS," also filed on Jan. 28, 2013, the contents of which are incorporated herein by reference.

This application is related to U.S. patent application Ser. No. 13/403,948, entitled "ADAPTIVE SYSTEM ARCHITECTURE FOR IDENTIFYING POPULAR TOPICS FROM MESSAGES," filed on Feb. 23, 2012, the contents of which are incorporated herein by reference.

This application is related to U.S. patent application Ser. No. 13/403,962, entitled "SYSTEMS AND METHODS FOR RECOMMENDING ADVERTISEMENT PLACEMENT BASED ON IN NETWORK AND CROSS NETWORK ONLINE ACTIVITY ANALYSIS," also filed on Feb. 23, 2012, the contents of which are incorporated herein by reference.

BACKGROUND

Through web-based media services like Twitter and Facebook, a user is exposed to a vast amount of messages from hundreds if not thousands of online sources and friends, culminating in massive amounts of information overload. Because the distinctions between each social network are not entirely clear, users feel obligated to juggle different applications and social networks just to keep up and be heard everywhere.

It would be one thing if all our social messages were part of a single, pars able, filtered stream. But instead, they come from all different directions. The situation is aggravated by social streams that originate in many competing silos. Users or consumers spend nearly as much time hopping between networks as we do meaningfully digesting and engaging the content within. Furthermore, the cross-posting across networks further exacerbates the noise and redundancy of the various networks and services.

BRIEF DESCRIPTION OF THE DRAWINGS

One or more embodiments of the present invention are illustrated by way of example and are not limited by the figures of the accompanying drawings, in which like references indicate similar elements.

FIG. 2 illustrates a screenshot showing an example stream data explorer interface.

FIG. 3 illustrates a screenshot showing an example user interface for filtering messages.

FIG. 7 illustrates a screenshot of an example message annotation tool interface.

FIG. 9 illustrates a screenshot of example lists of trending topics.

FIG. 14 illustrates a screenshot of an example dashboard interface for dynamically loading, unloading or hot-swapping micro apps.

DETAILED DESCRIPTION

Figure 1:
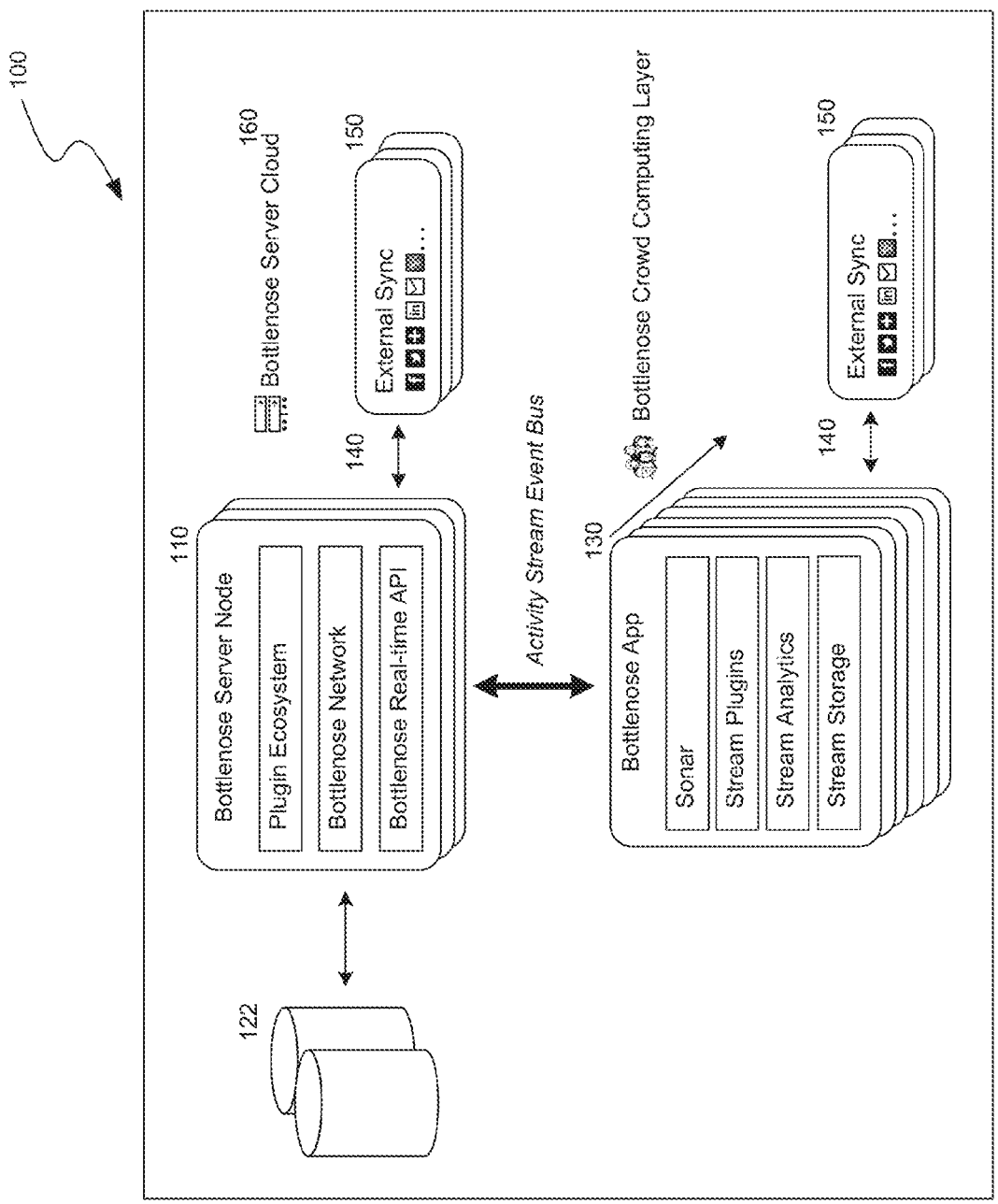
FIG. 1 illustrates an example architecture diagram of a social intelligence system for mediating and orchestrating communications with the client nodes and external services.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for natural language processing optimized for microcontent.

Architecture Overview

FIG. 1 illustrates an example architecture diagram of a social intelligence system 100 for mediating and orchestrating communications with the client nodes and external services. The social intelligence system 100 includes a plurality connected server nodes 110. The server nodes 110 of the social intelligence system 100 store a social network information store 122 (including social graph and message store). Messages posted by users of the intelligence cluster 100 are stored in the server nodes 110. The metadata of the messages travels between users and clients via the social intelligence system 100.

The social intelligence system 100 can also have client applications 132 running on client nodes 130. Messages from third-party networks 150 come in through sync connectors 140 which run on the server nodes 110 as well as client nodes 130. Many services allow direct messaging pipelines from the client nodes 130 to the external services from the third-party networks 150.

Storage on the server nodes does not take place until an action is done on these messages (e.g. like, annotate, repost). This avoids storing vast amounts of messages for each user which can become very costly when thousands of messages come in per user per day.

The client applications 132 can run multiple layers of stream analytics. In one embodiment, all layers of stream analytics run in the client nodes 130 to reduce the amount of CPU burdens on the server nodes 110. In another embodiment, the social intelligence system can be made more decentralized by enabling client-to-client messaging between client nodes. In yet another embodiment, the client nodes 130 can be configured to run as a stand-alone agent in a cloud computer platform 160.

Data Layer

All data coming in from external services are normalized based on a standard. In one embodiment, the data are normalized based on Activity Streams Open Standard ("ASOS"). The normalization process makes sure that all messages are stored in a structured way and that there is a common vocabulary to communicate regarding to the social objects. For example, a "User Timeline on Twitter" is normalized to "A Person's Activities".

External services can be queried by using a query language. In one embodiment, the external services are queried by using Activity Stream Query Language (ASQL). Using ASQL, data can be pushed and pulled between services. To support a new external service, the social intelligence system can implement a common Activity Stream interface for that service using ASQL.

FIG. 2 illustrates a screenshot showing an example stream data explorer interface 200. The social intelligence provides the stream data explorer interface 200 via the client nodes 130 or the server nodes 110 to developers to push or pull any data streams between services.

After normalization of the message data, all messages are enriched with metadata (details of the metadata will be discussed in the following section). The social intelligence system then filters these messages by matching the metadata of the messages against specific rules. In one embodiment, the social intelligence system can use a specialized rule language for this which allows complex conditional statements in filters.

FIG. 3 illustrates a screenshot showing an example user interface 300 for filtering messages. The social intelligence provides user interface 300 to users or developers to specify rules for filtering messages. The actual rule language can be chosen by the users, which allows more advanced conditionals to be specified.

Natural Language Processing ("NLP") and Annotation Capabilities

The social intelligence system utilizes a natural language processing stack optimized for microcontents. A microcontent is a small group of words that can be skimmed by a person to get a clear idea of the content of a content container such as a web page. Examples of microcontent include article headlines, page titles, subject lines, e-mail headings, instant messages, blog posts, RSS feeds, and abstracts. Such microcontent may be taken out of context and displayed on a directory, search result page, bookmark list, etc. Microcontents (e.g. Twitter messages, Facebook messages, and short message service (SMS) messages) are often written in a casual way. Such microcontents contain micro-syntax like repost directives and hashtags.

Parsing messages for the real-time web requires dealing with vast numbers of microcontents (e.g. small messages). That requires an efficient handling of the microcontents. In one embodiment, the natural language processing stack can be implemented in JavaScript. The natural language processing stack can run in any modern JavaScript environment (e.g. Webkit, NodeJS, Internet Explorer, etc.).

In one embodiment, the natural language processing stack extracts different types of metadata from the messages including topics, types, categories, languages, and others. The topics metadata include keywords that are most relevant to the messages. In some embodiments, the natural language processing stack assigns confidence scores to each of these keywords. The types metadata includes status of the messages, mood of the messages, whether the message is an offer, whether the message is a service, whether the message is a news. The categories metadata can include business, technology, entertainment, etc. The languages metadata indicates the language that the message's content is written in. Other metadata include uniform resource locators ("URLs"), mentions, hashtags, repost content, emoticons, content identification keys, etc.

Figure 4:
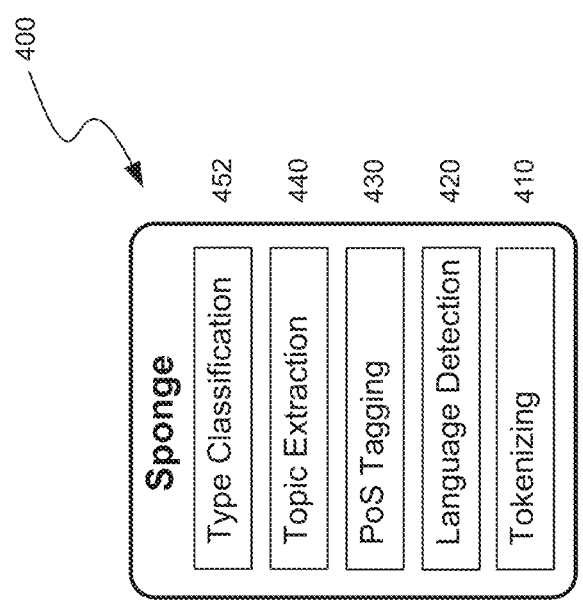
FIG. 4 illustrates an example architecture of a natural language processing stack including multiple layers.

FIG. 4 illustrates an example architecture of a natural language processing stack 400 including multiple layers. The natural language processing stack 400 processes a message by running the message through the layers. The first layer is a tokenizer layer 410 that can handle micro-syntax and punctuation (E.g. RT, /via, /cc, etc.). The tokenizer breaks a stream of text up to words phrases, symbols, or other meaningful elements called tokens. The list of tokens becomes input for further processing such as parsing or text mining. The second layer is a language detector layer 420. The language detector 420 can include a dictionary-based language detector that will detect if a message is in English or other languages. The language detector 420 can also include an NGram detector that can identify any language.

Then the messages go through a part of speech ("PoS") tagger layer 430. A part-of-speech tagging, also called grammatical tagging or word-category disambiguation, is the process of marking up a word in a text as corresponding to a particular part of speech, based on both its definition, as well as its context—i.e. relationship with adjacent and related words in a phrase, sentence, or paragraph. For instance, a form of PoS tagging is the identification of words as nouns, verbs, adjectives, adverbs, etc. In one embodiment, the PoS tagger layer 430 can use error-driven transformation-based tagger such as Brill tagger that is streamlined towards picking out nouns and proper nouns.

The fourth layer is a topic extractor layer 440. The topic extractor is unique in that it can do entity recognition without needing existing databases. For instance, topics like the name of Lady Gaga's latest album can be identified without having a prior dictionary of known entities. The topic extractor 440 extract topics from the messages and assigns confidence scores to the extracted topics based on capitalization and other factors. This approach is different than conventional entity extraction in which the extraction relies on dictionary lookups. For example, the latest album by Lady Gaga that was just released would not show up in such a dictionary and therefore will not be extracted by the conventional entity extraction approach as a topic. The topic extractor 440 can get such valuable information that cannot be identified by a dictionary.

Figure 5:
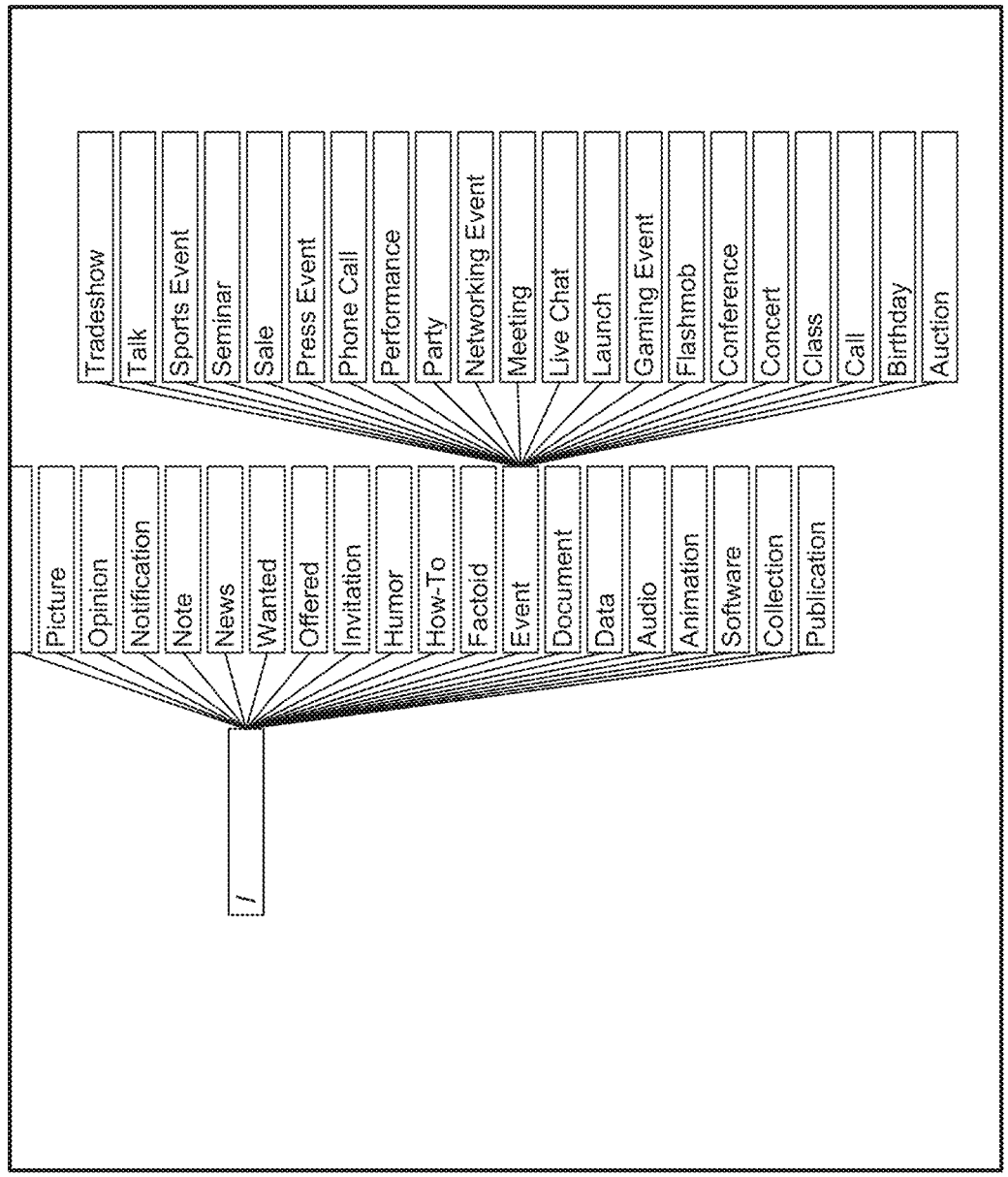
FIG. 5 illustrates an example of a database of classes and relationships between the classes.

The fifth layer is a type classification layer 450. In order to classify types and identify categories of messages, the natural language processing stack utilizes a database (also referred to as ontology) of classes together with a database of annotation rules. These annotation rules are composed of lists of names and patterns that help to assign the proper type tree to a message. For instance, more than a hundred message classes can be defined in the database with rules to detect these automatically. FIG. 5 illustrates an example of a database of classes and relationships between the classes. The social intelligence system can include an internal administration tool to edit the information related to class database and the annotation rules. In one embodiment, the layers can be applied to microcontents as steps of a method for microcontent natural language processing. Once a microcontent is received from a social networking site, the method can first tokenize the microcontent into a plurality of token texts. The language of the microcontent is detected and a dictionary is selected based on the detected language. The method further applies a part-of-speech tagging process on the microcontent based on the dictionary. The results are detected related pronouns and nouns form the microcontent. One or more topics are extracted from the detected related pronouns and nouns. The method can further include steps of ranking streams containing the microcontents.

Figure 6:
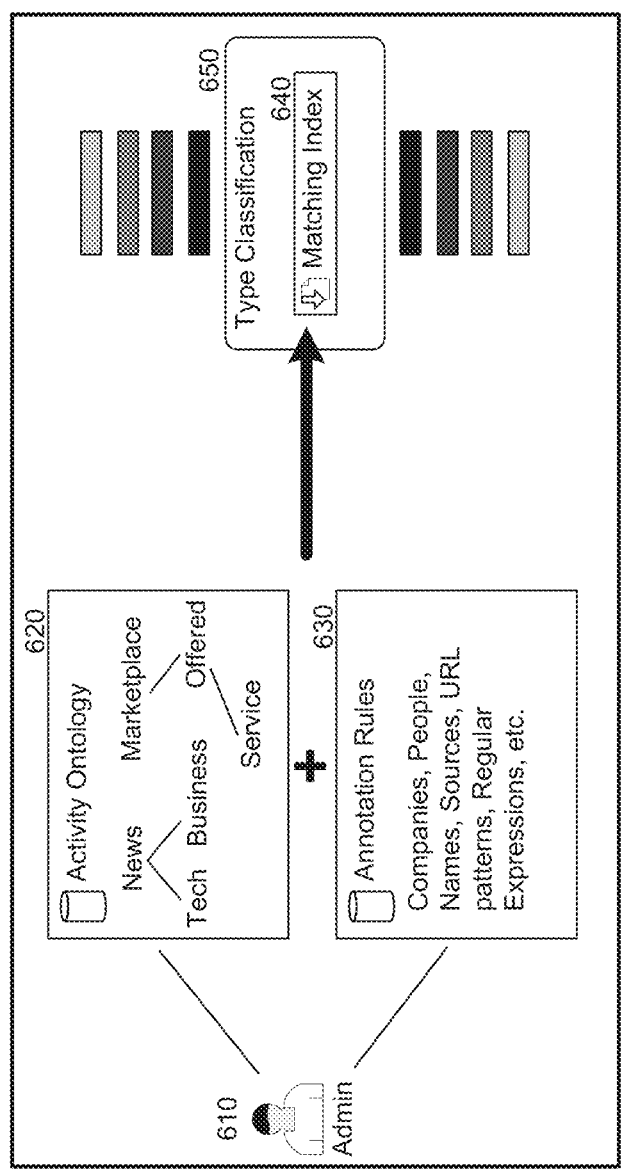
FIG. 6 illustrates an example process for a type classification process.

FIG. 6 illustrates an example process for a type classification process. The administrator 610 specifies the content of the database 620 (i.e. ontology) of the classes and the database 630 of annotation rules. The information in the database 620 of classes and the database 630 of annotation rules is complied into a matching index 640 of the type classification layer 650. The matching index 640 is a set of expressions that ensures a highly efficient matching. The matching index 640 can be sent to web browsers or anywhere the type classification layer 650 is running.

In addition to the type classification process, the natural language processing stack can further perform sentiment analysis to classify the sentiment of each message. Sentiment can be positive, negative or neutral. The sentiment analysis can run fully on the client nodes (as well as server nodes) allowing for high scalability. In one embodiment, to make this possible and light weight, the natural language processing stack includes a sentiment classifier implemented as a Naive Bayesian classifier, which is trained offline on an annotated set of positive, negative and neutral messages. Then the resulting probabilistic model is send to the client node for the sentiment classification.

FIG. 7 illustrates a screenshot of an example message annotation tool interface 700. The interface 700 provides types and topics for a specific message identified by a type classification layer of a natural language processing stack. Using the interface 700, the user is able to delete any types or topics that the user thinks incompatible with the message. The interface 700 further provides a sentiment (positive, neutral or negative) determined by the sentiment classifier. Using the interface 700, the user is able to manually change the sentiment annotation for the message.

Stream Rank

After messages are enriched with the metadata, the messages and their metadata are put through a stream rank analyzer. The stream rank analyzer takes the messages for a given context and produce new intelligence in the form of metadata for a stream of the context. For example, when the topic Japan gets mentioned very often, this is obviously something significant. The stream rank analyzer takes the messages for the topic Japan and produce new intelligence in the form of metadata for a stream regarding Japan.

Figure 8:
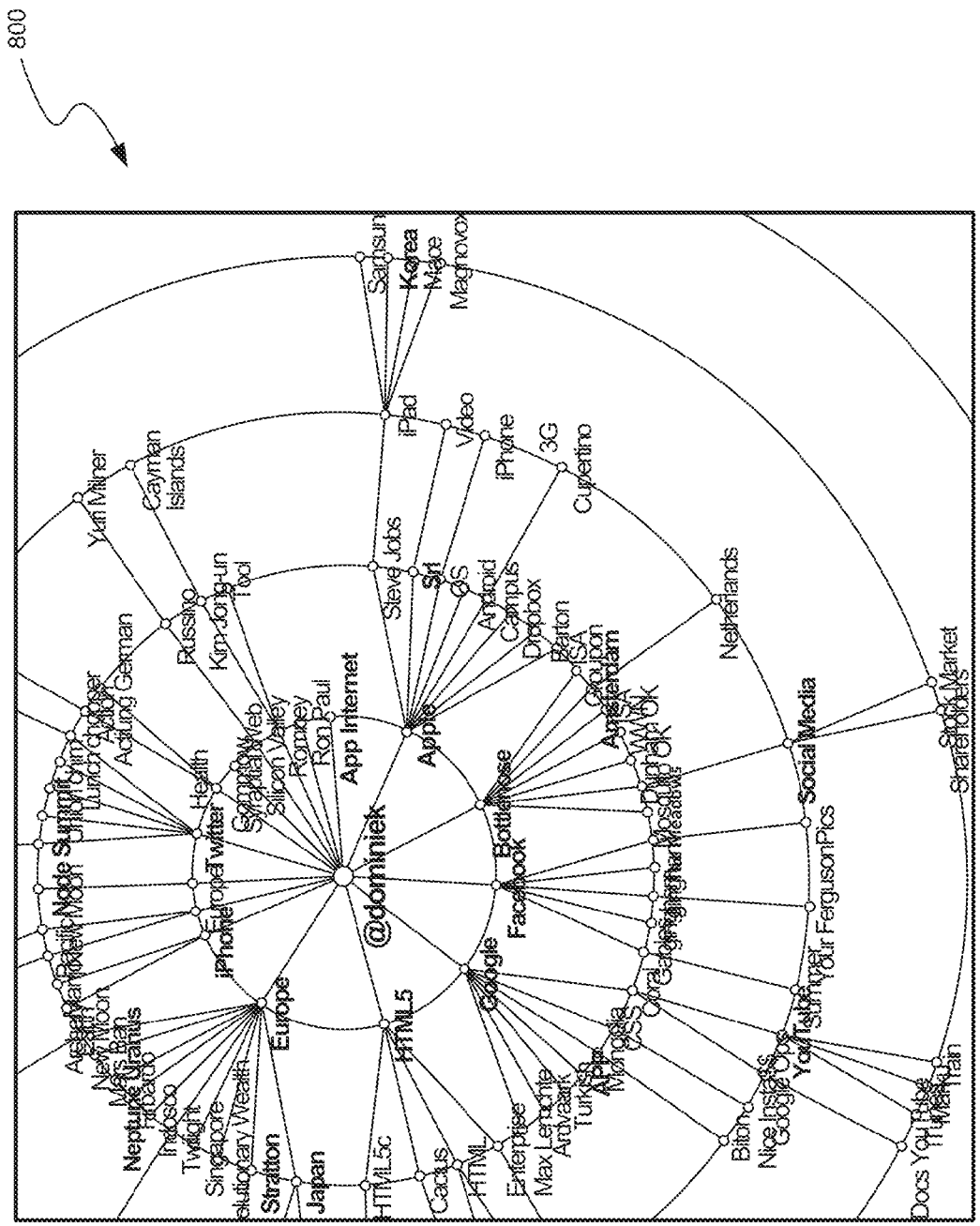
FIG. 8 illustrates a screenshot of an example visualization interface for results of a clustering process of a stream rank analyzer.

The stream rank analyzer can include two components. One is a clustering component for analyzing co-occurrences of metadata in a stream, and producing a graph data structure that can be used to recognize clusters of related data. Another is a profiling component for producing a flat list of most occurring and most trending (highest velocity or momentum) metadata. FIG. 8 illustrates a screenshot of an example visualization interface 800 for results of a clustering process of a stream rank analyzer.

The stream rank analyzer can look at any attribute of a message and rank the message. Examples of the attributes are: topics, types, mentioned people, authors, hashtags, links, media, keywords, author information, source information, etc. Each of these metadata attribute is counted and weighted in the clustering and profiling components. This results in a new data set of the most trending and relevant metadata items for a stream. In both clustering and profiling components, the time factor is used to look at which metadata items are gaining trend (i.e. velocity).

The results of stream rank analyzer can be used to provide all sorts of new intelligence for streams, including but not limited to: profiling interests, search personalization, targeted advertising, alerts of trending global events, etc.

Cloud and Trend Database

In one embodiment, the stream rank analyzer can run in a cloud computing platform in which the metadata of each message is converted into trend a trend database record. These trend database records have fields that store counts for specific conditions in which the message occurred in a given timeframe. For example, the message "I hate Christmas", can result in the following metadata: Topic=Christmas, Sentiment=Negative. Hence, for the trend database record with topic name "Christmas" the stream rank analyzer increases the 'sentiment negative counter' with 1. As time progresses and more messages flow through the stream rank analyzer, the trend database reflects a state of all the trends that are happening in a stream. Queries regarding the topics can be performed on this trend database. For instance, a list of topics that had the most negative can be generated by count of negative sentiment. FIG. 9 illustrates a screenshot of example lists of trending topics. For instance, the lists includes a list of top mentioned people by count of mentions, a list of top contributors by count of mentions, a list of top mentioned people by impressions, a list of top contributors by followers, a list of top positive contributors and a list of top negative contributors.

Trend database records are created for any piece of metadata regarding a message, including topics, types, hashtags, mentioned people, author, links, geographic segments, ethnicity, gender, etc.

For instance, the stream rank analyzer can use the following attributes as counters for the trend database record:
Volume (i.e. total number of messages that were found, which always increases)
Impressions (cumulative follower count of all authors)
Cumulative Klout Score
Gender Male, Gender Female
Ethnicity Black, Ethnicity White, Ethnicity Asian, etc.
Geo Segment Asia, Geo Segment Europe, Geo Segment Africa, etc.
Sentiment Negative, Sentiment Positive, Sentiment Neutral, Sentiment-20, Sentiment-19, Sentiment-18, Sentiment-17, etc. (e.g. A full heat map of different grades of sentiment).
Type Humor, Type Commercial, Type News, Type Mood, Type Question, Type Opinion, Type Event, Type Visual, etc. (For each type classification, the stream rank analyzer counts the number of messages that occurred. In this way, it is possible to find for example the 'Most Commercial Topics').
Network Twitter, Network Facebook, Network Z, etc.

For each of these counters except for volume, the rank stream analyzer can also use relative counters. These relative counters are percentages of the volume. So for instance, if the "Gender Male" count is 2, and the total volume is 4, the "Gender Male Percentage" counter would be "50%".

Also, the rank stream analyzer can use acceleration counters associated with the relative counters. This is basically a counter that compares the database of the current timeframe with the timeframe before. For instance, if there were 1000 impressions in the timeframe before, and 3000 impressions in the current timeframe, the "impressions acceleration counter" would be "+2000".

Thirdly, the rank stream analyzer can store specific ratio counters for some of the fields. These ratio counters allow the easy retrieval of specific ratio trends. For instance, a "Gender Female Ratio" helps the retrieval of "Most Masculine Topics", "Most Feminine Geo Regions", "Most Feminine Links", etc. Some example ratio counters are Gender (Male VS Female), Ethnicity (Black VS White, Black VS Asian, etc.), Engagement (Volume VS Impressions), and Network (Twitter VS Facebook, etc.).

Audience Segments

In one embodiment, the stream rank analyzer can be used to detect trends in any stream of messages. One of such streams includes messages from an audience segment; i.e. messages by a group of people that match a certain criteria. For example, "Female Soccer Fans" or "Republican Beer Drinkers". By using the stream rank analyzer can find trends from these segments and new insights to answer specific marketing research and business intelligence questions.

For any given topic (e.g. a brand called "Heineken"), the stream rank analyzer can compare the ranks of streams between different audience segments. In that way, the stream rank analyzer can show how the topic is trending and performing across different segments. This includes the ability to drill down into specific attributes of the trends, for example, how is the brand performing across different ethnicities in each segment, or how is sentiment across segments, or how opinionated is the brand in different segments.

Another example of an audience segment is "Everyone". When the stream rank analyzer is sued for the stream of all global mentions and messages, the stream rank analyzer can show what topics people around the world are focusing.

Quadrant Visualization of Stream Rank Trends

Figure 10:
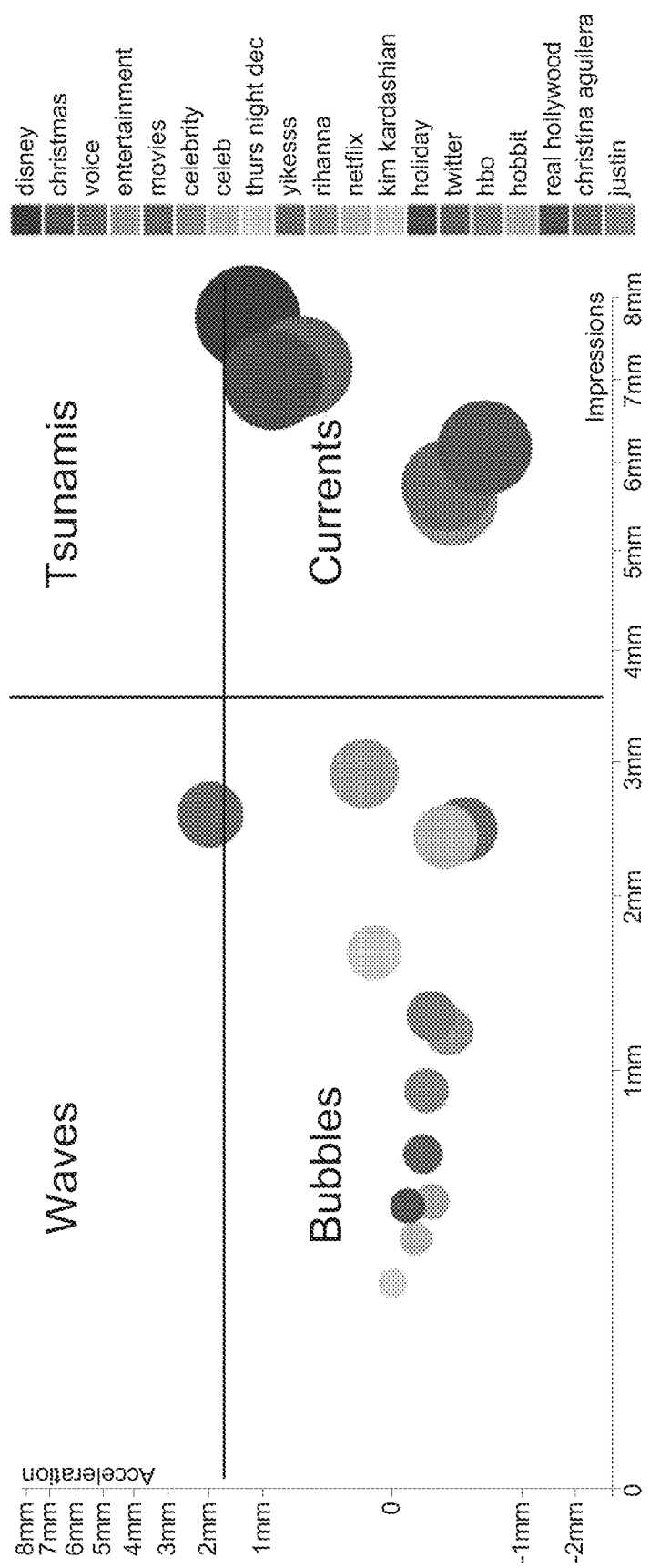
FIG. 10 illustrates an example quadrant plot for stream rank trends.

The stream rank analyzer can further include a quadrant visualizer for plotting the current "Trend State" on a scatter plot which is divided into 4 quadrants, based on the recorded stream rank trends. FIG. 10 illustrates an example quadrant plot for stream rank trends. The X axis can represent any of the trend attributes, e.g. volume, impressions, male count, etc. In the example shown in FIG. 10, the X axis represents "Impressions." The Y axis can represent the acceleration of the trend attribute (i.e. How much did it gain compared to the previous timeframe). The result is a scatter plot as showed in FIG. 10. The volumes of the scatters represent the size of the trend (i.e. Z axis). In some embodiments, the Z axis can represent other attributes as mentioned in previous paragraphs.

Each quadrant of the scatter plot has a different meaning. The Waves quadrant indicates small trends that are spiking right now, but have a low momentum. The Bubbles quadrant indicates no trend yet (low acceleration, and low momentum). The Currents quadrant indicates sustained trends that have a low acceleration. The Tsunamis quadrant indicates trends that have high momentum, high acceleration.

Figure 11:
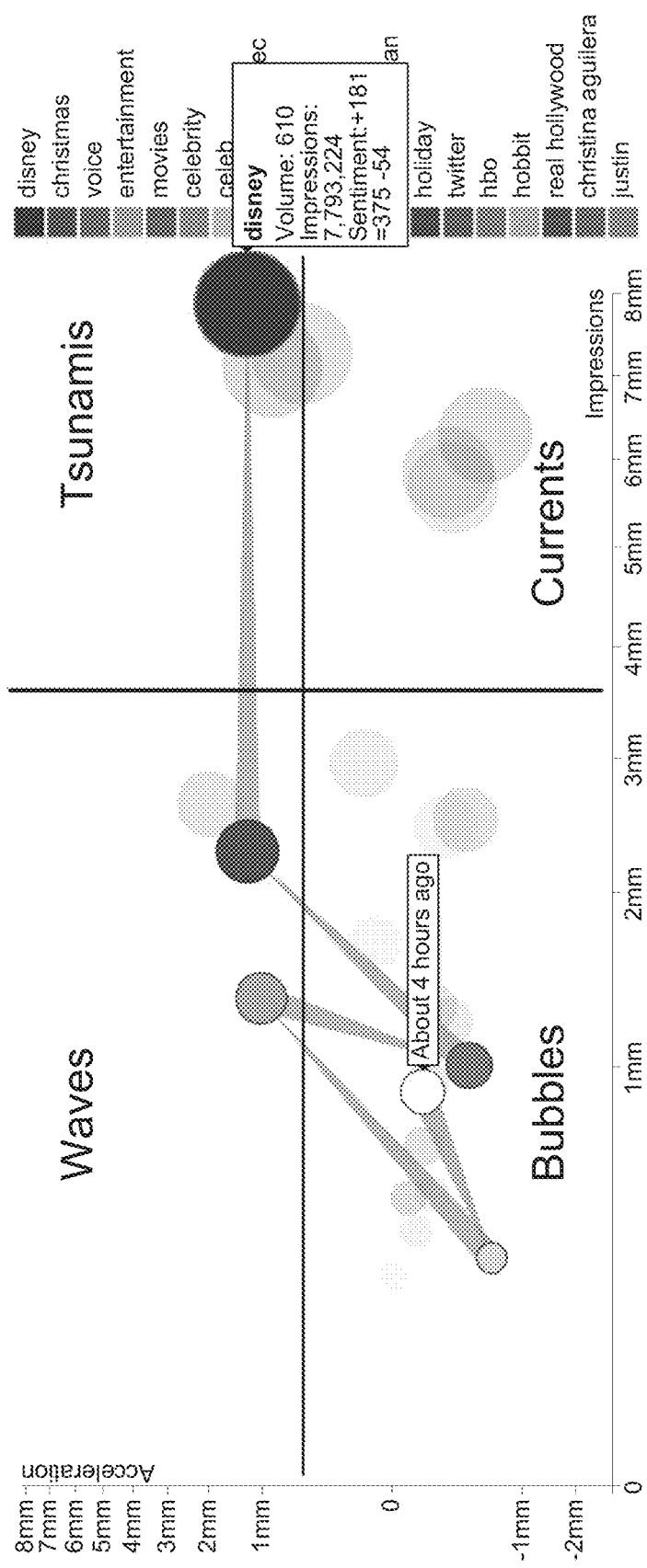
FIG. 11 illustrates example changes of the quadrant plot over a time period.

For each timeframe a plot of this kind can be visualized. These plots can be animated over time to reflect how the trend is changing across different quadrants over a time period, as illustrated in FIG. 11. The movement of these scatters (i.e. trends) allows users to see how attention is changing in the stream. For example, when a trend starts moving to the right-side of the "Waves" quadrant, this could be an indicator of a Tsunami-sized trend about to happen.

Stream Rank Derived Trend Activity Events

The stream rank analyzer can further generate a trend activity record for each attribute that changed inside a stream rank trend. For example, if the volume of topic X dropped 25% in a given timeframe, the stream rank analyzer can generate a trend activity of a severity of "topic X, volume −25%". Any attribute mentioned in the previous sections can be used to generate a trend activity record. For each of these trend activity events, the stream rank analyzer can assign an impact score based on the severity in event. For instance, an event of volume change of 40% has a higher impact score than an event of volume change of 4%.

Figure 12:
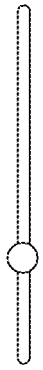
FIG. 12 illustrates an example of a UI that shows different trend activity events.

FIG. 12 illustrates an example of a UI that shows different trend activity events. The UI shows trend activity events regarding a topic "Nike." Each trend activity event is associated with an impact score. For instance, the event of "434K people (60%) started paying attention to Lance Armstrong in one hour" has an impact score of 78. The information about the trend activity events can be used to show both a high-level and a low-level detail of how attention moves around regarding any given topic.

Decentralized Attention Indexing

In order to analyze messages on a global level, the stream rank analyzer includes a strategy for building an index of real-time social networking data. Conventional scraping and spidering approaches employed by search engines such as Google rely on software programs that find, crawl and download web pages using a large server infrastructure. This approach does not work for the real-time data needs of social networks. By the time the crawl would be finished, all data can be outdated.

The stream rank analyzer provides a solution by including application programs for indexing messages part of the browser. The stream rank analyzer includes a browser extension or other form of software called an attention tracker that can be installed within the browser.

Figure 13:
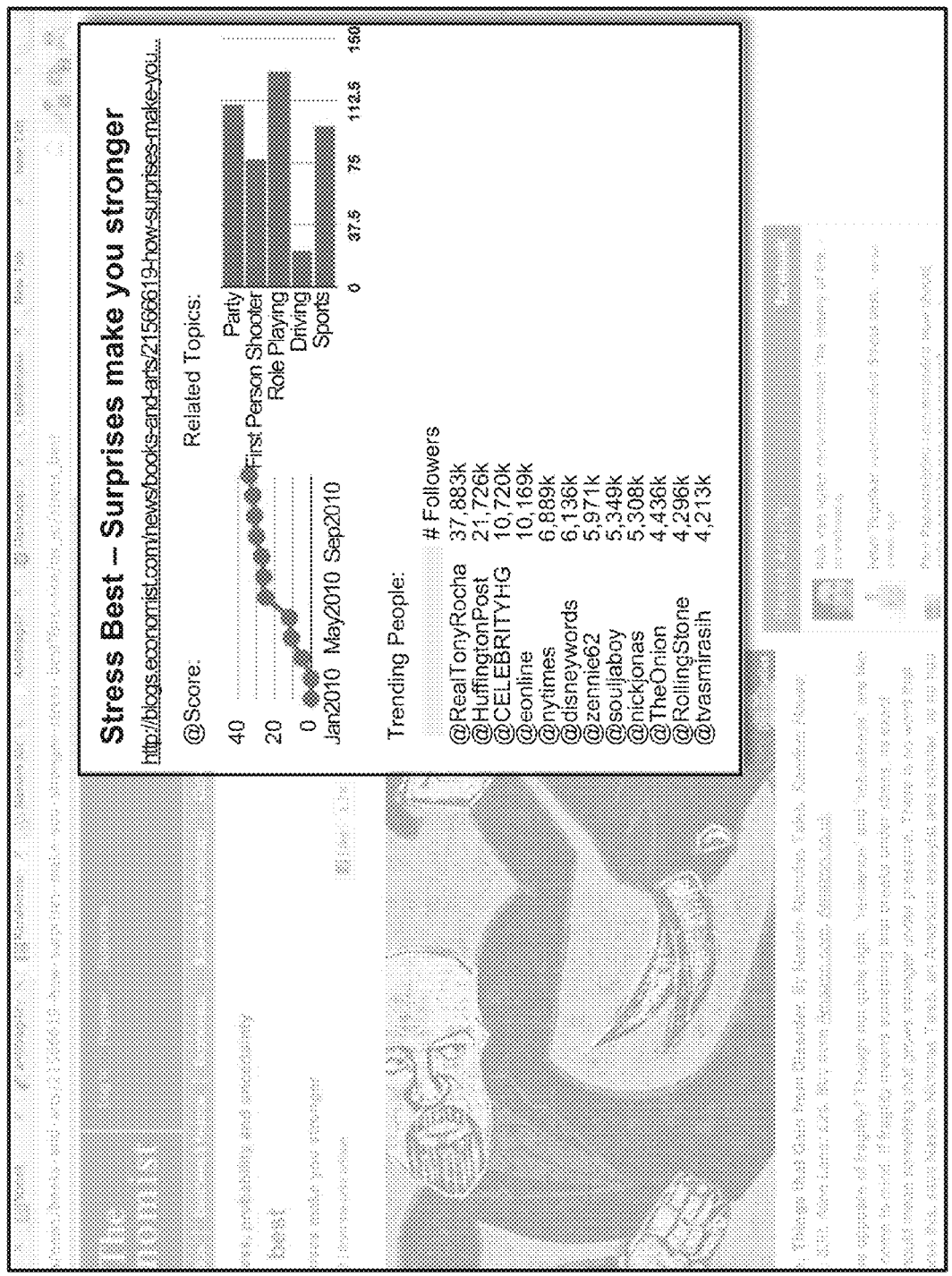
FIG. 13 illustrates a screenshot of an example attention tracker as a browser extension that provides trend insights around links visited while indexing social network data in the background.

FIG. 13 illustrates a screenshot of an example attention tracker as a browser extension that provides trend insights around links visited while indexing social network data in the background. The attention tracker then contacts the attention index server of the stream rank analyzer, i.e. a central server that manages these trackers, to receive indexing commands. The attention index has a long list of common keywords and trending topics that can be used to search real-time data on social networks. Each attention tracker will receive indexing commands that include a specific set of keywords for a topic in the indexing network. The attention tracker then goes and search for those keywords on social networks such as Twitter, Facebook, Pinterest, Tumblr, etc., and submits the results back to the central attention index server. The tracker performs the search task on a continuous basis and the frequency of search can be controlled by the indexing commands that get renewed periodically. The central attention index server filters through the IDs of the received messages and disregards any duplicate messages.

The keywords inside the indexing commands can include global popular topics, but can also include common words or expressions on social networks like "A", "http", "the". Some of these common keywords represent a large part of the activity on social networks. For example 60% of all messages on Twitter include the word "http". By continuously searching for this on the Twitter website with a random date-range interval, it is possible to siphon a large portion of the global stream with a relatively few number of attention trackers. Also, this mechanism bypasses API access controls and can not be blocked in the way that conventional indexing bots are blocked.

Another benefit is that implicit attention data can be added to the attention index. Examples of the implicit attention data include browsing behavior (e.g. which links were visited, and which pieces of metadata did those links have) or user behavior inside social networks (e.g. how long did a person look at a message, which messages were not seen, etc.). All of these implicit attention data can be used in building a map of the user population's attention in a high detail.

Real-Time Applications

In one embodiment, the social intelligence system includes an application layer for developing, running and managing real-time applications. Developers can code apps in HTML5 and JavaScript for this layer. Developers do not need to worry about integrating with hundreds of APIs. The rich metadata and structure around messages give developers the power to build highly domain specific tools and new interactive experiences around the stream.

The application layer a framework that allows plugins (also referred to as micro apps) to be developed at light speed using a technique called real-time coding. A developer can use tools provided by the social intelligence system to change the current running instance of the social intelligence system. The framework can rapidly hot-swap the changed pieces of running code. FIG. 14 illustrates a screenshot of an example dashboard interface for dynamically loading, unloading or hot-swapping micro apps. This means that right after a piece of code has been changed, the changes are visible in actual running instance of the social intelligence system. This radically changes the speed of development and the quality of code because it becomes easier to think many steps ahead.

The applications and servers of the social intelligence system can be implemented using various techniques, as readily understood by a person having ordinary skill in the art. For instance, in one embodiment, the applications running on the client nodes along with browser, browser-side routing frameworks are used to ensure UI flow is neatly structured and that user interaction is speedy. HTML5 and modern JavaScript APIs are used to allow access to storage, audio, rendering capabilities and web workers. For mobile applications the HTML and/or JavaScript programs are wrapped in a wrapper that allows communication with the mobile operating system.

In one embodiment, the server nodes of the social intelligence system uses a minimalist web framework (called Express) that runs on top of a server side software system for writing scalable internet applications such as NodeJS. The server nodes utilize the framework in combination with a JavaScript library such as SockJS to provide a real-time communication pipeline to the client-side applications of the social intelligence system.

In one embodiment, all software on the server nodes is written in JavaScript which runs in a NodeJS environment. Every message that gets posted through the client-side application of the social intelligence system will be stored with metadata on a central server implemented as a scalable, high-performance, database, such as MongoDB. The server nodes can be operated by a standard Ubuntu Linux distribution.

Since the heavy use of client-side capacity, the social intelligence system's hardware needs are relatively low. In one embodiment, social intelligence system includes multiple database servers and multiple application servers running NodeJS. Each of these servers can have a standard multi-core CPU, high memory and solid-state drive configuration. In one embodiment, third-party content delivery platform, e.g. Amazon's CloudFront CDN, can be used to rapidly serve all code, media assets and static data to client-side applications of the social intelligence system.

Figure 15:
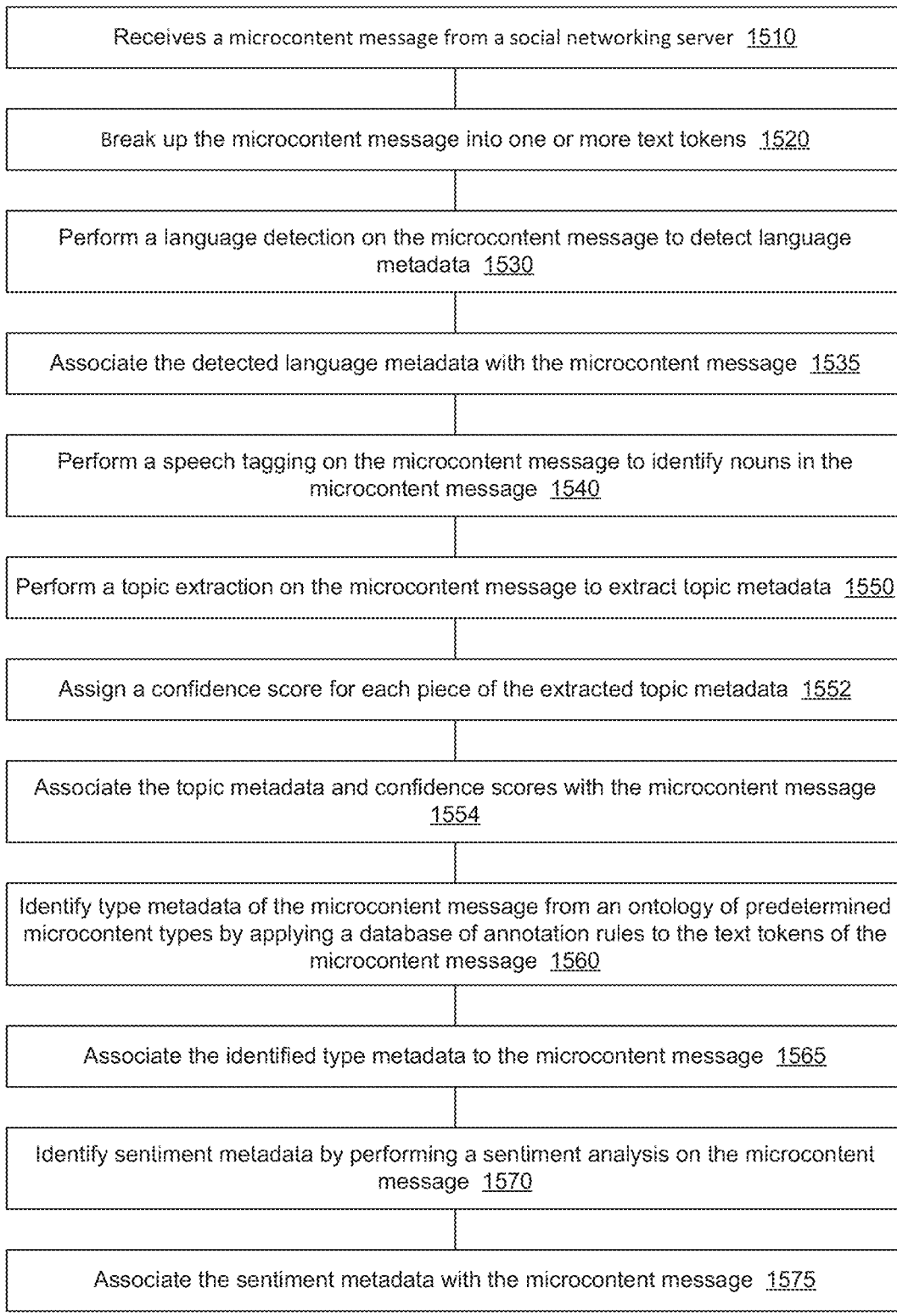
FIG. 15 depicts an example flow chart illustrating an example process for microcontent natural language processing.

FIG. 15 depicts an example flow chart illustrating an example process for microcontent natural language processing. In process 1510, a social intelligence system receives a microcontent message from a social networking server. In process 1520, the system breaks up the microcontent message into one or more text tokens.

In process 1530, the system performs a language detection on the microcontent message to detect language metadata. Then in process 1535, the system associates the detected language metadata with the microcontent message. In one embodiment, the language detection is based on a dictionary-based language detector or an NGram language detector.

In process 1540, the system performs a speech tagging on the microcontent message to identify nouns in the microcontent message. In one embodiment, the speech tagging is based on a Brill tagger method.

In process 1550, the system performs a topic extraction on the microcontent message to extract topic metadata. Then in process 1552, the system assigns a confidence score for each piece of the extracted topic metadata. In process 1554, the system associates the topic metadata and confidence scores with the microcontent message. In one embodiment, the topic extraction is based on factors including capitalization.

In process 1560, the system identifies type metadata of the microcontent message from an ontology of predetermined microcontent types by applying a database of annotation rules to the text tokens of the microcontent message. In one embodiment, the process 1560 can include compiling a matching index including a set of expressions based on the ontology of predetermined microcontent types or the database of annotation rules; and matching the expressions of the matching index with the microcontent message.

In one embodiment, the ontology of predetermined microcontent types is organized as a relational database including trees of the predetermined microcontent types. The annotation rules includes list of names and patterns that help assigning a tree of the trees of the predetermined microcontent types to the microcontent message. In process 1565, the system associates the identified type metadata to the microcontent message.

In process 1570, the system identifies sentiment metadata by performing a sentiment analysis on the microcontent message. In process 1575, the system associates the sentiment metadata with the microcontent message. In one embodiment, the sentiment analysis is based on a Naïve Bayesian classifier that is trained offline to an annotated set of positive, negative and neutral microcontent messages.

Figure 16:
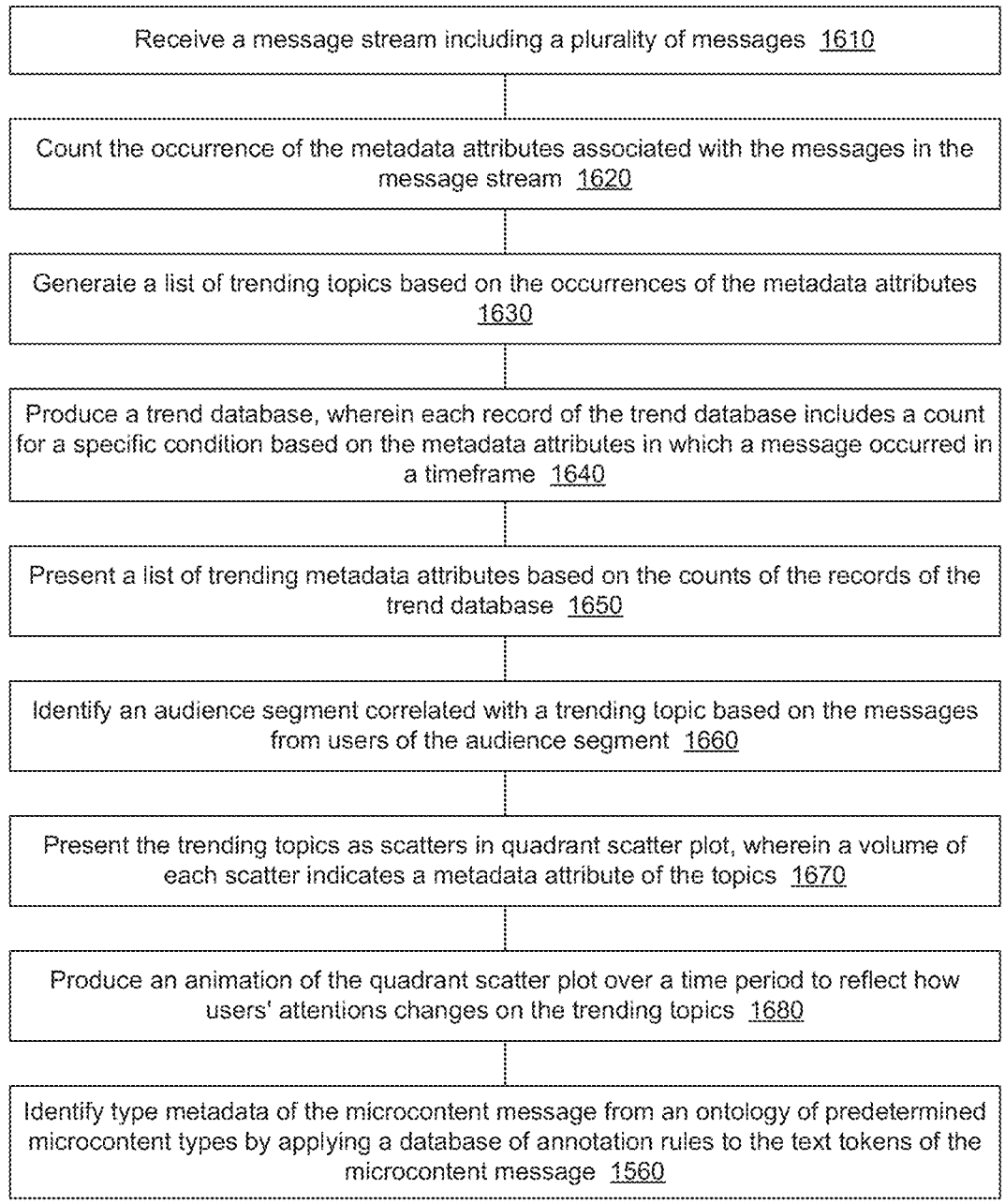
FIG. 16 depicts an example flow chart illustrating an example process for message stream rank.

FIG. 16 depicts an example flow chart illustrating an example process for message stream rank. In process 1610, a social intelligence system receives a message stream including a plurality of messages. Each of the messages is associated with metadata attributes. In process 1620, the system counts the occurrence of the metadata attributes associated with the messages in the message stream. In process 1630, the system generates a list of trending topics based on the occurrences of the metadata attributes.

In process 1640, the system produces a trend database. Each record of the trend database includes a count for a specific condition based on the metadata attributes in which a message occurred in a timeframe. In one embodiment, a record of the trend database can further include a relative counter, an acceleration counter or a ratio counter. In process 1650, the system presents a list of trending metadata attributes based on the counts of the records of the trend database. In one embodiment, the metadata attributes include topics, types, hashtags, mentioned people, author, links, geographic segments, ethnicity, or genders.

In process 1660, the system identifies an audience segment correlated with a trending topic based on the messages from users of the audience segment. In process 1670, the system presents the trending topics as scatters in quadrant scatter plot, wherein a volume of each scatter indicates a metadata attribute of the topics. Then in process 1680, the system produces an animation of the quadrant scatter plot over a time period to reflect how users' attentions changes on the trending topics.

Figure 17:
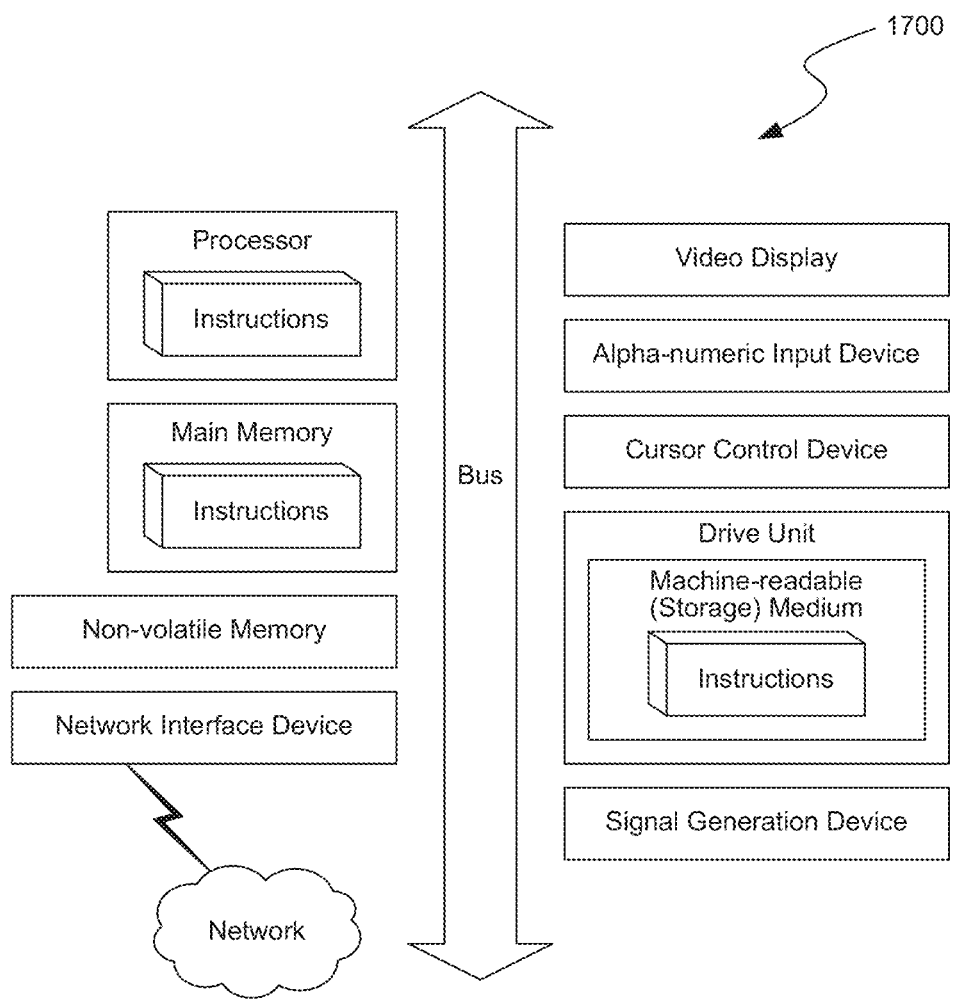
FIG. 17 shows a diagrammatic representation of a machine in the example form of a computer system within which a set of instructions, for causing the machine to perform any one or more of the methodologies discussed herein, may be executed.

FIG. 17 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for microcontent natural language processing comprising:
   receiving a plurality of microcontent messages from a social networking server, the plurality of microcontent messages including a microcontent message;
   breaking up the microcontent message into one or more text tokens by using a tokenizer module that is configured to process micro-syntax and punctuation in the microcontent message;
   performing a part-of-speech (POS) tagging process on the text tokens to identify a linguistic category for each of the text tokens, wherein the POS tagging process for a respective text token is performed using an error-driven transformation-based tagger and based on a definition and a context of the respective text token;

performing a topic extraction on the microcontent message to extract topic metadata for the microcontent message based on the identified linguistic category for each of the text tokens, wherein the extraction is performed without looking up a pre-specified topic in a dictionary of known entities;

associating a topic metadata to the microcontent message based on the extracted topic;

generating sentiment metadata for the microcontent message by performing a sentiment analysis on the one or more text tokens to classify a sentiment of the microcontent message, wherein the sentiment analysis is based on a Naïve Bayesian classifier;

associating the sentiment metadata with the microcontent message;

analyzing co-occurrence of all available metadata in the plurality of microcontent messages;

producing a list that ranks the plurality of microcontent messages based on all available topic metadata and sentiment metadata associated with the plurality of microcontent messages; and compiling a trend database that reveals how perception of users of the social networking server on a given topic changes by tracking how the list changes over time.

2. The method of claim 1, wherein the Naïve Bayesian classifier is trained offline on an annotated set of positive, negative and neutral messages.

3. The method of claim 1, further comprising:
identifying type metadata from the microcontent message based on an ontology of predetermined microcontent types by applying a database of annotation rules to the text tokens of the microcontent message; and
associating the identified type metadata to the microcontent message;
wherein the ontology of predetermined microcontent types are organized as a relational database including trees of the predetermined microcontent types.

4. The method of claim 3, wherein the annotation rules include lists of names and patterns that help assigning a tree of the trees of the predetermined microcontent types to the microcontent message.

5. The method of claim 3, further comprising:
providing an interface for users to edit the ontology of predetermined microcontent types or the database of annotation rules.

6. The method of claim 3, wherein the step of identifying type metadata of the microcontent message includes:
compiling a matching index including a set of expressions based on the ontology of predetermined microcontent types or the database of annotation rules; and
matching the expressions of the matching index with the microcontent message.

7. The method of claim 1, further comprising:
performing a language detection on the microcontent message to detect language metadata; and
associating the detected language metadata with the microcontent message.

8. The method of claim 7, wherein the language detection is based on a dictionary-based language detector or an NGram language detector.

9. The method of claim 1, further comprising:
performing a speech tagging on the microcontent message to identify nouns in the microcontent message.

10. The method of claim 9, wherein the speech tagging is based on a Brill tagger method.

11. The method of claim 1, further comprising:
assigning a confidence score for each piece of the extracted topic metadata; and
associating the confidence scores the topic metadata associated with the microcontent message.

12. The method of claim 1, further comprising:
presenting, via a user interface, the list of trending topics as scatters in a quadrant scatter plot, wherein a volume of a respective scatter indicates a size of a trending topic represented by the respective scatter.

13. A system comprising:
a network component configured for receiving a plurality of microcontent messages from a social networking server, the plurality of microcontent messages including a microcontent message;
a processor; and
a memory storing instructions which, when executed by the processor, cause the system to perform a process including:
breaking up the microcontent message into one or more text tokens by using a tokenizer module that is configured to process micro-syntax and punctuation in the microcontent message;
performing a part-of-speech (POS) tagging process on the text tokens to identify a linguistic category for each of the text tokens, wherein the POS tagging process for a respective text token is performed using an error-driven transformation-based tagger and based on a definition and a context of the respective text token;
performing a topic extraction on the microcontent message to extract topic metadata for the microcontent message based on the identified linguistic category for each of the text tokens, wherein the extraction is performed without looking up a pre-specified topic in a dictionary of known entities;
associating a topic metadata to the microcontent message based on the extracted topic;
generating sentiment metadata for the microcontent message by performing a sentiment analysis on the one or more text tokens to classify a sentiment of the microcontent message, wherein the sentiment analysis is based on a Naïve Bayesian classifier;
associating the sentiment metadata with the microcontent message;
analyzing co-occurrence of all available metadata in the plurality of microcontent messages;
producing a list that ranks the plurality of microcontent messages based on all available topic metadata and sentiment metadata associated with the plurality of microcontent messages; and
compiling a trend database that reveals how perception of users of the social networking server on a given topic changes by tracking how the list changes over time.

14. The system of claim 13, wherein the process further includes:
identifying type metadata from the microcontent message based on an ontology of predetermined microcontent types by applying a database of annotation rules to the text tokens of the microcontent message; and
associating the identified type metadata to the microcontent message.

15. The system of claim 14, wherein the step of identifying type metadata of the microcontent message includes:

compiling a matching index including a set of expressions based on the ontology of predetermined microcontent types or the database of annotation rules; and matching the expressions of the matching index with the microcontent message.

16. The system of claim 13, wherein the process further includes:

performing a language detection on the microcontent message to detect language metadata, wherein the language detection is based on a dictionary-based language detector or an NGram language detector; and associating the detected language metadata with the microcontent message.

17. The system of claim 13, wherein the process further includes:

performing a speech tagging on the microcontent message to identify nouns in the microcontent message, wherein the speech tagging is based on a Brill tagger method.

18. The system of claim 13, wherein the process further includes:

presenting, via a user interface, the list of trending topics as scatters in a quadrant scatter plot, wherein a volume of a respective scatter indicates a size of a trending topic represented by the respective scatter; and producing an animation of the quadrant scatter plot over a time period to reflect how the trending topics change in the plurality of microcontent messages.

19. The system of claim 13, wherein the process further includes:

producing an animation of the quadrant scatter plot over a time period to reflect how the trending topics change in the plurality of microcontent messages.

* * * * *